United States Patent [19]

Shaffer, Jr. et al.

[11] Patent Number: 4,540,874

[45] Date of Patent: Sep. 10, 1985

[54] CONTROL SYSTEM FOR ELECTRIC WATER HEATER WITH HEAT PUMP EXTERNAL HEAT SOURCE

[75] Inventors: Jacob E. Shaffer, Jr.; Joseph F. Picarello, both of York, Pa.

[73] Assignee: Borg-Warner Corporation, Chicago, Ill.

[21] Appl. No.: 570,338

[22] Filed: Jan. 13, 1984

[51] Int. Cl.³ .................. H05B 1/02; F28F 27/00; F25B 29/00; F24H 1/00

[52] U.S. Cl. .................... 219/279; 62/238.6; 165/29; 219/325; 219/328; 219/364; 237/2 B

[58] Field of Search ............... 219/279, 364, 325, 326, 219/328, 331; 165/29; 237/2 B; 62/238.6, 238.7

[56] References Cited

U.S. PATENT DOCUMENTS 3,017,162 1/1962 Haines et al. ............... 219/279
4,385,723 5/1983 Sandborn et al. ............ 219/279 X Primary Examiner—A. Bartis
Attorney, Agent, or Firm—Julian Schachner

[57] ABSTRACT

A control system for an electric water heater operatively associated with an external heat source, such as a heat pump. The water heater includes a water storage tank provided with an electric tank heating unit having a tank thermostat which closes in response to water temperature in the tank, allowing a flow of current through the tank heating unit so as to turn it on to heat the water, and which opens when the tank thermostat has been satisfied, interrupting the current flow so as to turn the tank heating unit off. The control system as responsive to the initial current surge through the tank heating unit when the tank thermostat closes to (1) interrupt the current flow to the tank heating unit so as to maintain the heating unit off and (2) to turn on the external heat source and maintain it on until the tank thermostat opens. The initial current surge cleans the contacts of the tank thermostat by burning off any insulating oxide residues which may have formed on them. The control system includes means responsive to abnormal conditions which would prevent the external heat source from heating water effectively for (1) turning off the external heat source and turning on the tank heating unit and (2) maintaining the external heat source off and the tank heating unit on until the tank thermostat is satisfied.

8 Claims, 3 Drawing Figures

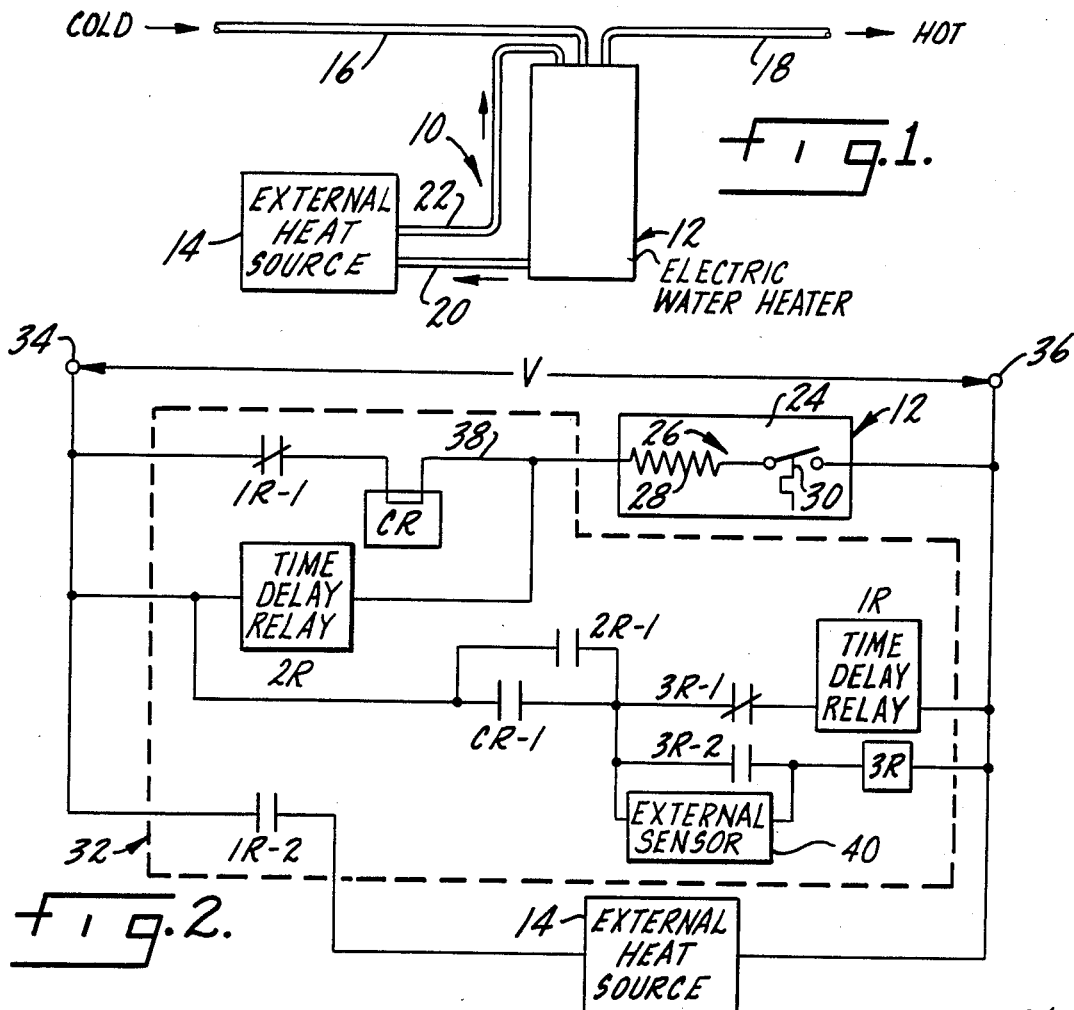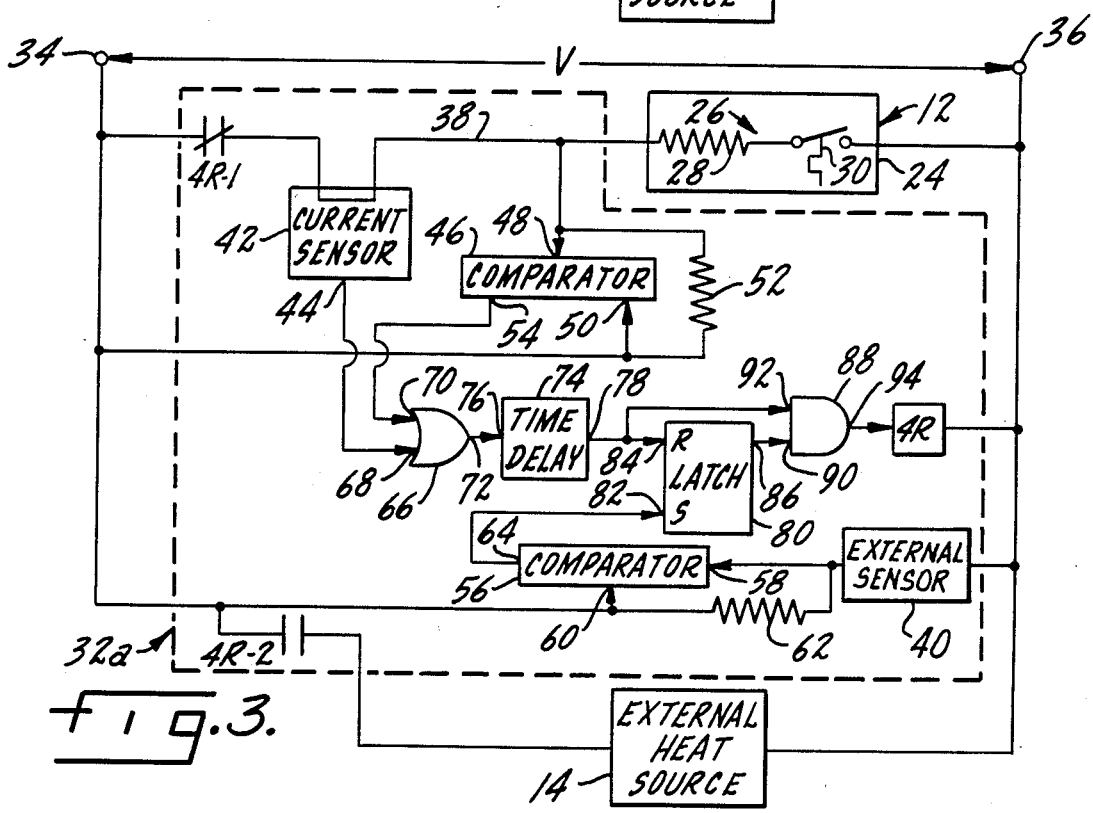

CONTROL SYSTEM FOR ELECTRIC WATER HEATER WITH HEAT PUMP EXTERNAL HEAT SOURCE

BACKGROUND OF THE INVENTION

This invention relates generally to a control system for a water heater with an external heat source. More particularly, it is directed to a control system for a conventional domestic hot water heater in association with an external heat source which may take the form of a heat pump.

A conventional domestic hot water heater typically includes an internal heat source in the form of a tank heating unit having an electric heating element and a tank thermostat. When the thermostat indicates a demand for hot water, the tank heating unit is turned on. When the thermostat indicates that the demand for hot water has been satisfied, the tank heating unit is turned off.

The heat pump has been known for many years. Although it is generally more economical to operate than a conventional tank heating unit, it has not been used extensively heretofore because power, particularly electric power, has been inexpensive. As the cost of power increases, there is renewed interest in the use of a heat pump in association with a water heater, particularly for providing domestic hot water.

When a heat pump is used with a hot water heater, it would be advantageous if its control system were responsive to the tank thermostat as an indicator of the demand for hot water. Such an arrangement is disclosed in Shaffer et al U.S. application Ser. No. 450,499 filed Dec. 16, 1982. That application is of common assignee herewith, and is incorporated herein by reference. Although the control system disclosed is an advance in the art, it is known now that it does not provide adequately for cleaning the contacts of the tank thermostat. Thus, there remains a need in the art for such a control system which does provide adequately for cleaning the contacts of the tank thermostat.

SUMMARY OF THE INVENTION

This invention is directed to meeting this need. To that end, there is disclosed a control system for a water heater operatively associated with an external heat source. The water heater includes a water storage tank and a tank heating unit. The tank heating unit has a tank thermostat which closes when there is a demand for hot water in the tank, allowing a flow of current through the tank heating unit so as to turn it on. The tank thermostat opens when the demand has been satisfied, interrupting the current flow so as to turn off the tank heating unit. The control system is responsive to an initial current surge through the tank heating unit for interrupting the current flow so as to maintain the tank heating unit off. This initial current surge cleans the contacts of the tank thermostat by burning off any residue thereon. The control system also turns on the external heat source.

The control system is responsive to an external condition for turning off the external heat source, turning on the tank heating unit, and maintaining the external heat source off and tank heating unit on until the tank thermostat opens.

BRIEF DESCRIPTION OF THE DRAWING

The objects and advantages of this invention will become apparent to those skilled in the art upon careful consideration of the specification herein, including the drawing, wherein:

FIG. 1 is a piping diagram of a typical domestic hot water heater with an external heat source;

FIG. 2 is a wiring diagram showing details of the control system of this invention, using electromechanical components, as applied to a typical domestic hot water heater with an external heat source; and FIG. 3 is a wiring diagram showing details of the control system of this invention, using electronic components, as applied to a typical domestic hot water heater with an external heat source.

While this invention is susceptible of embodiment in many different forms, the preferred embodiment is shown in the drawing and described in detail. It should be understood that the present disclosure is considered to be an exemplification of the principles of the invention, and is not intended to limit the invention to this embodiment.

DESCRIPTION OF THE PREFERRED EMBODIMENT

Turning now to FIG. 1 of the drawing in greater detail, reference numeral 10 designates generally a hot water heater with an external heat source. In the preferred form of the invention, this includes a conventional domestic hot water heater 12 and an external heat source 14 in the form of a heat pump or the like. Water heater 12 and heat pump 14 may be of the type disclosed in the aforementioned U.S. application Ser. No. 450,499.

An inlet water pipe 16 directs cold make-up water to water heater 12. An outlet water pipe 18 supplies hot water to the user. A pipe 20 is provided for directing water to be heated from water heater 12 to heat pump 14. Similarly, a pipe 22 is provided for directing heated water from heat pump 14 to water heater 12.

As shown in FIG. 2, water heater 12 includes a hot water supply tank 24 with a tank heating unit 26 having one or more electric heating elements, generally designated by reference number 28, connected in series with one or more tank thermostats, generally designated by reference number 30. Water heater 12 is used without modification in association with external heat source 14, and both are under the control of a control system shown within a dashed enclosure identified by reference number 32. Control system 32 uses electro-mechanical components.

Control system 32 includes a first, time-off delay relay having a coil 1R, a normally closed contact set 1R-1, and a normally open contact set 1R-2. Contact set 1R-2 and external heat source 14 are connected in series across a pair of first and second terminals 34 and 36 to which a voltage V may be applied. When energized, relay 1R opens contact set 1R-1 and closes contact set 1R-2. When de-energized, contact set 1R-1 closes and contact set 1R-2 opens after a delay. The length of this time delay is a design feature and might be, for example, one second.

Control system 32 also includes a current relay having a coil CR and a normally open contact set CR-1. Contact set 1R-1, current relay CR and tank heating unit 26 are connected by a suitable line 38 in series across terminals 34 and 36, with one side of tank heating unit 26 being connected to terminal 36.

A second, time-off delay relay has a high-impedance coil 2R connected in series with tank heating unit 26 across terminals 34 and 36. Relay 2R also has a normally open contact set 2R-1 connected in parallel with contact set CR-1. When relay 2R is de-energized, contact set 2R-1 opens after a delay. The length of this time delay is a design feature and might be, for example, one second.

A third relay has a coil 3R, a normally closed contact set 3R-1, and a normally open contact set 3R-2. Relay 1R is coupled through contact set 3R-1 to the parallel combination of contact sets 2R-1 and CR-1. As shown in FIG. 2, relay 1R and this parallel combination are connected in series with contact set 3R-1 across terminals 34 and 36. Similarly, relay 3R, contact set 3R-2, and the parallel combination of contact sets 2R-1 and CR-1 are connected in series across terminals 34 and 36. At least one suitable external sensor 40, for example an external thermostat, is connected in parallel with contact set 3R-2.

The operating cycle is initiated when thermostat 30 closes, indicating a demand for hot water in tank 24. Current relay CR will sense an initial surge of current in line 38, and will close contact set CR-1 to complete an energizing circuit for relay 1R. Relay 1R will be energized, opening contact set 1R-1 so as to maintain tank heating unit 26 off, and closing contact set 1R-2 so as to turn external heat source 14 on.

Even though tank heating unit 26 remains off, the initial surge of current in line 38 cleans the contacts of tank thermostat 30 by burning off any insulating oxides which may have formed as a residue on them.

At this time current relay CR no longer senses current flow in line 38. Contact set CR-1 will open, de-energizing relay 1R. However, as relay 1R is of the time-off delay type, contact set 1R-1 will remain open for a short time, for example one second. During this delay high-impedance relay 2R, in series with the relatively low impedance of heating element 28, will be energized. Contact set 2R-1 will close, completing another energizing circuit for relay 1R before contact set 1R-1 closes. For this reason it is important that there be a delay from the time an energizing circuit for relay 1R is interrupted to the time contact set 1R-1 closes. The delay should be of sufficient duration such that contact set 1R-1 remains open. Tank heating unit 26 remains off, and heat pump 14 remains on.

When the demand for hot water has been satisfied, thermostat 30 will open, de-energizing relay 2R. Contact set 2R-1 opens to de-energize relay 1R. Contact set 1R-1 closes, and contact set 1R-2 opens. External heat source 14 will be turned off, concluding the operating cycle.

If some abnormal condition prevents external heat source 14 from heating water effectively, for example a low temperature condition at the heat pump evaporator, this will be detected by external sensor 40. If sensor 40 closes while contact set 2R-1 is closed, relay 3R will be energized, opening contact set 3R-1 and closing contact set 3R-2. External sensor 40 now has no effect on relay 3R.

When contact set 3R-1 opens, relay 1R will be de-energized. Contact set 1R-2 opens turning off external heat source 14. Contact set 1R-1 closes, turning on tank heating unit 26 and de-energizing high-impedance relay 2R. Contact set 2R-1 will open after a delay. However, current relay CR will sense the flow of current in line 38, closing contact set CR-1 before contact set 2R-1 opens. There will be no disruption of power to relay 3R.

Relay 3R will remain energized until thermostat 30 is satisfied and opens. This will be sensed by current relay CR, opening contact set CR-1 and concluding the operating cycle.

As shown in FIG. 2, relay 3R, contact sets 3R-1 and 3R-2, and external sensor 40 together constitute additional means for controlling water heater 12 and external heat source 14 in response to some external condition. If this feature is not required, these components could be eliminated. Relay 1R would be connected directly to the parallel combination of contact sets 2R-1 and CR-1. High-impedance relay 2R would not require a time-off delay.

Turning now to FIG. 3, there is shown a modified control system 32a generally using electronic components. The water heater, external heat source, and the arrangements of some components are the same as described with reference to FIG. 2. They are identified by the same reference numbers.

Control system 32a includes a current sensor 42 (replacing current relay CR) which senses the current in line 38. Current sensor 42 has an output 44 which is high when current is flowing in line 38, and is low when no current is flowing.

A first comparator 46 has inputs 48 and 50. Input 48 is connected to line 38 between tank heating unit 26 and a contact set 4R-1 of a relay 4R to be described. Input 50 is connected to terminal 34. A resistor 52 is connected to inputs 48 and 50 to equalize the voltage levels at these inputs when both contact set 4R-1 and thermostat 30 are open. Comparator 46 also has an output 54 which is high when the voltage levels at inputs 48 and 50 are unequal, and is low when they are equal.

A second comparator 56 has inputs 58 and 60. Input 58 is connected to one side of external sensor 40, the other side of which is connected to terminal 36. Input 60 is connected to terminal 34. Another resistor 62 is connected to inputs 58 and 60 to equalize the voltage levels at these inputs when external sensor 40 is open. Comparator 56 also has an output 64 which is low when the voltage levels at inputs 58 and 60 are unequal, and is high when they are equal.

An OR gate 66 has inputs 68 and 70. Input 68 is connected to output 44 of current sensor 42, and input 70 is connected to output 54 of comparator 46. OR gate 66 also has an output 72 which is high when either input 68 or 70 is high.

A time delay 74 has an input 76 and an output 78. Input 76 is connected to output 72 of OR gate 66. Time delay 74 may be a simple integrator with a time constant of, for example, one-tenth second. Thus the signal appearing at output 78 is delayed briefly.

A latch 80 has a set input 82 and a reset input 84. Input 82 is connected to output 64 of comparator 56, and input 84 is connected to output 78 of time delay 74. Latch 80 also has an output 86 which is high when input 84 is low. When input 84 is high, output 86 will go low when input 82 goes low, and will remain low until input 84 goes low again.

An AND gate 88 has inputs 90 and 92. Input 90 is connected to output 86 of latch 80, and input 92 is connected to output 78 of time delay 74. AND gate 88 also has an output 94 which is high when both inputs 90 and 92 are high.

Relay 4 is coupled through AND gate 88 and latch 80 to output 78 of time delay 74. As shown in FIG. 3, one side of relay 4R is connected to output 94 of AND gate 88, the other side being connected to terminal 36. Relay 4R will be energized when output 94 goes high, opening contact set 4R-1 and closing a contact set 4R-2.

When there is no demand for hot water in tank 24, thermostat 30 is open. Current sensor 42 senses that no current is flowing in line 38. Output 44 of current sensor 42 and input 68 of OR gate 66 are low.

Input 48 of comparator 46 is connected by contact set 4R-1 to terminal 34. The voltage levels of inputs 48 and 50 are equal, as they both are connected to terminal 34. Output 54 of comparator 46 and input 70 of OR gate 66 are low.

With both inputs 68 and 70 of OR gate 66 low, output 72 is low. Input 76 of time delay 74 is low, as is output 78. Input 84 of latch 80 and input 92 of AND gate 88 are low. With input 84 of latch 80 low, output 86 of latch 80 and input 90 of AND gate 88 are high. Output 94 of AND gate 88 is low, and relay 4R is deenergized.

External sensor 40 is open, and the voltage levels of inputs 58 and 60 of comparator 56 are equal. Output 64 of comparator 56 and input 82 of latch 80 are high.

The operating cycle is initiated when thermostat 30 closes, indicating a demand for hot water in tank 24. An initial surge of current in line 38 cleans the contacts of thermostat 30, burning off any residue. Current sensor 42 will sense this current surge, and will drive output 44 high. Input 68 of OR gate 66 will go high, driving output 72 high. Input 76 of time delay 74 will go high, driving output 78 high. Input 84 of latch 80 and input 92 of AND gate 88 will go high.

At this time there has been no change at input 82 of latch 80; it remains high. Output 86 of latch 80 and input 90 of AND gate 88 thus remain high. When input 92 goes high, output 94 is driven high, energizing relay 4R. Contact set 4R-1 opens, maintaining tank heating unit 26 off. Contact set 4R-2 closes, turning on external heat source 14.

With contact set 4R-1 now open, current sensor 42 senses that no current is flowing in line 38, driving output 44 low. Input 68 of OR gate 66 will go low, driving output 72 low. However, as there still is a demand for heat in tank 24, thermostat 30 remains closed. Input 48 of comparator 46 now is connected by thermostat 30 to terminal 36. The voltage levels of inputs 48 and 50 will be unequal, driving output 54 high. Input 70 of OR gate 66 will go high, driving output 72 high. Output 72 may go low and then high again during this transition, but time delay 74 assures that output 78 remains high. Input 84 of latch 80 and input 92 of AND gate 88 remain high.

Thermostat 30 opens when the demand for hot water in tank 24 has been satisfied. The voltage levels at inputs 48 and 50 of comparator will be equal, driving output 54 low. Input 70 of OR gate 66 will go low, driving output 72 low. Input 76 of time delay 74 will go low, driving output 78 low. Input 84 of latch 80 will go low, holding output 86 high. Input 92 of AND gate 88 will go low while input 90 remains high, driving output 94 low so as to de-energize relay 4R. Contact set 4R-1 closes. Contact set 4R-2 opens, turning off external heat source 14 and concluding the operating cycle.

If some abnormal condition prevents external heat source 14 from heating water effectively, external sensor 40 will close, connecting input 58 of comparator 56 to terminal 36. The voltage levels at inputs 58 and 60 will be unequal, driving output 64 low. Input 82 of latch 80 will go low while input 84 remains high, driving output 86 low. Input 90 of AND gate 88 will go low while input 92 remains high, driving output 94 low so as to de-energize relay 4R. Contact set 4R-1 closes, turning on tank heating unit 26. Contact set 4R-2 opens, turning off external heat source 14.

With contact set 4R-1 closed, the voltage levels at inputs 48 and 50 of comparator 50 will be equal, driving output 54 low. Input 70 of OR gate 66 will go low, driving output 72 low. However, current sensor 42 will sense that current is flowing in line 38, driving output 44 high. Input 68 of OR gate 66 will go high, driving output 72 high. Again time delay 74 assures that input 84 of latch 80 remains high during this transition. Output 86 will remain low irrespective of the state of input 82. Input 90 of AND gate 88 will remain low, holding output 94 low. Thus, relay 4R will remain de-energized until thermostat 30 opens, even if external sensor 40 opens before thermostat 30.

As shown in FIG. 3, external sensor 40, comparator 56, latch 80, and AND gate 88 together constitute additional means for controlling water heater 12 and external heat source 14 in response to some external condition. If this feature is not required, these components could be eliminated. Relay 4R would be connected directly to output 78 of time delay 74.

From the foregoing it will be apparent that to initiate the operating cycle, external heat source 14 is turned on when tank thermostat 30 indicates that there is a demand for hot water in tank 24. External heat source 14 is turned off when thermostat 30 indicates that the demand has been satisfied, concluding the operating cycle.

If external sensor 40 indicates an abnormal condition, external heat source 14 is turned off and tank heating unit 26 is turned on. This condition prevails until thermostat 30 indicates that the demand for hot water has been satisifed, at which time tank heating unit 26 is turned off, concluding the operating cycle.

An important advantage of this invention is that each time an operating cycle is initiated, the initial surge of current through tank heating unit 26 cleans the contacts of thermostat 30.

Another important advantage of this invention is that it may be used in conjunction with a conventional domestic hot water heater without modification thereof, and thus without voiding the Underwriters' Laboratories approval. All that is required is a connection of the external power leads of the hot water heater to terminal 36 and line 38.

The high/low logic levels referred to in this disclosure are by way of example. They could be reversed if desired.

The term "connected" indicates a connection between two components such that an electrical current can flow between them. The term "coupled" indicates a functional relationship between two components, with the possible interposition of other components and/or elements (including air), between them.

What is claimed is:

1. A control system for a water heater operatively associated with an external heat source, said water heater including a water storage tank and an electric tank heating unit, said tank heating unit having at least one tank thermostat responsive to water temperature in said tank, said tank thermostat closing when there is a demand for hot water in said tank thereby allowing a current to flow through said tank heating unit so as to turn it on and opening when the demand has been satisfied thereby interrupting the current flow through said tank heating unit so as to turn it off, said control system comprising means responsive to an initial current surge through said tank heating unit when said tank thermostat closes both for interrupting the current flow so as to maintain said tank heating unit off and for turning said external heat source on, the initial current surge cleaning the contacts of said tank thermostat by burning off any residue thereon.

2. The control system of claim 1, further comprising additional means responsive to at least one external condition for turning off said external heat source, turning on said tank heating unit, and maintaining said external heat source off and said tank heating unit on until said tank thermostat opens.

3. The control system of claim 2, said means including a current relay having a normally open contact set, a first time-off delay relay having a normally closed contact set and a normally open contact set, and a second time-off delay relay of the high-impedance type having a normally open contact set, said tank heating unit, current relay and first relay normally closed contact set being connected in series across first and second terminals to which a voltage may be applied, said external heat source and said first relay normally open contact set being connected in series across said terminals, said first relay and the parallel combination of said current relay contact set and second relay contact set being coupled in series across said terminals, and said tank heating unit and said second relay being connected in series across said terminals.

4. The control system of claim 3, said additional means including at least one external sensor, and a third relay having a normally closed contact set and a normally open contact set, said third relay, the parallel combination of said external sensor and third relay normally open contact set, and the parallel combination of said current relay contact set and second relay contact set being connected in series across said terminals, and said third relay normally closed contact set being connected in series with said first relay and the parallel combination of said current relay contact set and second relay contact set.

5. The control system of claim 2, said means including a current sensor having an output which is high when current flow is sensed, a first comparator having first and second inputs and an output which is high when the voltage levels at its inputs are unequal, a resistor connecting said inputs of said first compartor, a time-off delay relay having a normally closed contact set and a normally open contact set, said tank heating unit, current sensor and normally closed contact set forming a series connection across first and second terminals to which a voltage may be applied, said tank heating unit being connected to said second terminal, said first input of said first comparator being connected to said series connection between said tank heating unit and said normally closed contact set, said second input of said first compartor being connected to said first terminal, said normally open contact set and said external heat source being connected in series across said first and second terminals, an OR gate having first and second inputs respectively connected to said current sensor output and said first comparator output, said OR gate having an output which is high when either of its inputs is high, and a time delay having an input connected to said OR gate output and an output, said relay being coupled to said time delay output and connected to said second terminal.

6. The control system of claim 5, said additional means including a latch having set and reset inputs and an output which is high when its reset input is low and which, when its reset input is high, goes low when its set input goes low and remains low until its reset input goes low again, said reset input being connected to said time delay output, an AND gate having first and second inputs respectively connected to said latch output and said time delay output, said AND gate also having an output which is high when both of its inputs are high, said relay being coupled to said time delay output by being connected to said AND gate output, a second comparator having first and second inputs and an output which is low when the voltage levels at its inputs are unequal, another resistor connecting said inputs of said second comparator, and an external sensor connected to said first input of said second comparator and said second terminal, said second input of said second comparator being connected to said first terminal, and said output of said second comparator being connected to said set input of said latch.

7. The control system of claim 1, said means including a current relay having a normally open contact set, a first time-off delay relay having a normally closed contact set and a normally open contact set, and a second time-off delay relay of the high-impedance type having a normally open contact set, said tank heating unit, current relay and first relay normally closed contact set being connected in series across first and second terminals to which a voltage may be applied, said external heat source and said first relay normally open contact set being connected in series across said terminals, said first relay and the parallel combination of said current relay contact set and second relay contact set being coupled in series across said terminals, and said tank heating unit and said second relay being connected in series across said terminals.

8. The control system of claim 1, said means including a current sensor having an output which is high when current flow is sensed, a first comparator having first and second inputs and an output which is high when the voltage levels at its inputs are unequal, a resistor connecting said inputs of said first comparator, a time-off delay relay having a normally closed contact set and a normally open contact set, said tank heating unit, current sensor and normally closed contact set forming a series connection across first and second terminals to which a voltage may be applied, said tank heating unit being connected to said second terminal, said first input of said first comparator being connected to said series connection between said tank heating unit and said normally closed contact set, said second input of said first comparator being connected to said first terminal, said normally open contact set and said external heat source being connected in series across said first and second terminals, an OR gate having first and second inputs respectively connected to said current sensor output and said first comparator output, said OR gate having an output which is high when either of its inputs is high, and a time delay having an input connected to said OR gate output and an output, said relay being coupled to said time delay output and connected to said second terminal.

\* \* \* \* \*